Patented May 5, 1953

2,637,734

UNITED STATES PATENT OFFICE 2,637,734

SULPHONATED (Bz-1-BENZANTHRONYL)-1-AMINOANTHRAQUINONE COMPOUNDS

Albin Peter and Jacques Günthart, Basel, Switzerland, assignors to Sandoz, A. G., Basel, Switzerland No Drawing. Application December 19, 1949, Serial No. 133,942. In Switzerland December 28, 1948

5 Claims. (Cl. 260—364)

The present invention relates to acid dyestuffs of the anthraquinone series which yield orange to brown dyeings, and to the preparation of such dyestuffs.

Briefly stated, it has been found that the aforesaid dyestuffs can be obtained by condensing a 1-aminoanthraquinone which is unsubstituted in the 2-position but which contains an aryloxy group in one of the positions 3, 4, 5, 6, 7 and 8, with a Bz-1-halogenbenzanthrone, and treating the condensation product with a sulfonating agent.

The aryloxy-substituted aminoanthraquinone is obtained by heating a halogenated or nitrated aminoanthraquinone with a phenol in the presence of an acid binding agent. As the phenol, use may be made for example of: phenol ($C_6H_5OH$); monoalkylated phenols such as o-, m-, p-cresol, p-ethylphenol, p-isopropylphenol, p-sec.- and tert.-butylphenol, p-sec.- and tert.-amylphenol, p-iso-octylphenol; dialkylated phenols such as 2.4-, 2.5-, 2.6- and 3.5-xylenols; trialkylated phenols such as 2.4.6-trimethylphenol; also phenols with two benzene nuclei, such as 2-naphthol and p-hydroxydiphenyl.

The thus-obtained amino-aryloxyanthraquinones, many of which are new compounds, are orange, red and brown powders which dissolve in chlorobenzene with yellow to orange coloration, and in concentrated sulfuric acid with weakly yellow (when the aryloxy group is in the 3- or 6-position), powerful orange, brown and dark red colorations. Dark red solutions in sulfuric acid are produced by the 1-amino-7-aryloxyanthraquinones, as well as—at least initially—by the 1-amino-chloro-aryloxyanthraquinones, which are obtained by condensation of 1-amino-6.7-dichloroanthraquinone with phenols. In the latter case, the aryloxy group appears to occupy the 7-position.

As Bz-1-halogenbenzanthrone, use is made, according to the present invention, of Bz-1-chlorobenzanthrone and Bz-1-bromo-benzanthrone.

The condensation is carried out by heating the 1-amino-aryloxyanthraquinone with the Bz-1-halogenbenzanthrone in a solvent which is inert to the reaction, such as nitrobenzene, naphthalene, diphenylmethane, methylcyclohexanol, benzyl alcohol, etc., with addition of an acid-binding agent such as sodium carbonate, potassium acetate, etc., and of a small quantity of copper powder or of a copper salt such as cupric chloride, cuprous chloride, copper acetate, etc., to a temperature of 170–220° C. until the alcohol-soluble starting materials disappear. At 200° C., for example, the condensation is generally completed in several hours.

The condensation products may be recovered by distilling off the solvent either directly or by means of steam or by diluting the condensation melt with alcohol, solvent naphtha, chlorobenzene, etc. and filtering off. The condensation products are brown powders which dissolve in sulfuric acid with characteristic coloration. In order to convert them into the water-soluble dyestuffs of the present invention, they are dissolved in sulfuric acid monohydrate and treated with oleum until a test specimen dissolves in water with formation of a clear solution. The products are orange to brown dyes, which can be recovered by pouring the reaction mass into salt water, filtering and neutralizing.

The new dyestuffs dye animal fibers such as wool, silk and tussah, and also synthetic superpolyamide fibers, in valuable brown-orange to powerful brown shades. The dyestuffs draw onto wool from a neutral or weakly acid bath and yield dyeings of outstanding fastness to washing, fulling and light.

The following detailed examples illustrate the invention without, however, being limitative thereof.

Example 1

11.6 parts by weight of 1-amino-3-phenoxyanthraquinone, 11.4 parts by weight of Bz-1-bromo-benzanthrone, 3.9 parts by weight of anhydrous potassium acetate and 0.3 part by weight of cuprous chloride are stirred for 6 hours at 200° C. with 100 parts by weight of anhydrous nitrobenzene. Test specimens poured into alcohol finally give a brown suspension in a colorless solution. The reaction mass is diluted at 100° C. with 100 parts by weight of alcohol, the formed precipitate suction-filtered, washed with alcohol and then with water and dried. The obtained base dissolves in sulfuric acid with a black-violet coloration.

5 parts by weight of the dyestuff base are dissolved in 30 parts by weight of sulfuric acid monohydrate, 15 parts by weight of 27% fuming sulfuric acid added, and stirring carried out for 1 hour at room temperature. A cold test specimen will then dissolve in water with formation of a clear solution. The dyestuff is then precipitated in a 15% aqueous salt solution, suction-filtered, and neutralized in conventional manner.

The obtained dyestuff dyes wool in beautiful red-brown shades of excellent fastness to fulling and light.

Example 2

In the same manner as that described in Example 1, 1-amino-3-(4'-methyl)-phenoxyanthraquinone is condensed with Bz-1-bromobenzanthrone to a dyestuff base, which dissolves in sulfuric acid with currant red coloration.

5 parts by weight of the dyestuff base are introduced into 20 parts by weight of sulfuric acid monohydrate at a temperature below 20° C. and then cooled to below 5° C. 8 parts of 25% oleum are allowed to run in, while constantly maintaining the temperature below 5° C., and then stirring is carried out for several hours at low temperature. By precipitation in ice and salt water, suction filtration and neutralization, a dyestuff is obtained which dyes wool a very light-fast red-brown.

By doubling the quantity of oleum, there is obtained, under otherwise unchanged conditions, an orange-brown dyestuff, the dyeings of which on wool are excellently fast to fulling and light.

Example 3

A mixture of 12.2 parts by weight of Bz-1-bromobenzanthrone, 14.8 parts by weight of 1-amino-3-p-tert.-butylphenoxyanthraquinone, 6 parts by weight of anhydrous potassium acetate and 0.5 part by weight of cuprous chloride is heated to 200° C. with 100 parts by weight of nitrobenzene while stirring, and is maintained at this temperature until a test specimen in alcohol indicates the disappearance of the starting materials. The temperature is then allowed to drop to 20° C. and the precipitated dyestuff base is filtered off, washed first with nitrobenzene or chlorobenzene, then with alcohol and water, and dried. There is obtained a red-brown crystalline powder which dissolves only difficultly in high-boiling solvents, such as nitrobenzene and o-chlorobenzene, with orange-brown coloration. It dissolves in concentrated sulfuric acid with a currant red coloration, which turns red on addition of boric acid, and violet-red with paraformaldehyde.

5 parts by weight of the dyestuff base are dissolved in 35 parts by weight of sulfuric acid monohydrate at a temperature below 20° C., then cooled in an ice bath, and 10 parts by weight of 27% oleum are then added in small portions at a temperature below 5° C. After four hours' stirring at 5° C., a test specimen is completely soluble in cold water. The reaction mass is poured into ice and salt water, the dyestuff filtered off by suction filtration and adjusted to neutrality with sodium carbonate. It dyes wool, silk and polyamide fibers in red-brown shades; the dyeings on wool are distinguished by their excellent fastness to fulling and light.

A brownish-orange dye with the same very good fastness properties is obtained if double the quantity of oleum is used for the sulfonation.

Similar dyestuffs are obtained if the 1-amino-3-p-tert.-butylphenoxyanthraquinone is replaced by 1-amino-3-p-sec.-amylphenoxyanthraquinone.

Example 4

10.1 parts by weight of Bz-1-bromo-benzanthrone are stirred for 6 hours at 200° C. with 12.6 parts by weight of 1-amino-3-p-tert.-amylphenoxyanthraquinone, 3.5 parts by weight of anhydrous potassium acetate and 0.3 part of cuprous chloride in 50 parts by weight of anhydrous nitrobenzene. The reaction mass is diluted at 100° C. with 100 parts by weight of isopropyl alcohol, suction-filtered, washed with isopropyl alcohol, then with water, and dried. The obtained dyestuff base is soluble in sulfuric acid with dark violet coloration.

By sulfonation of 5 parts of dyestuff base in 30 parts by weight of sulfuric acid monohydrate and 15 parts by weight of 25% oleum below 20° C., a dyestuff of good solubility is obtained, which dyes wool in a brown-orange shade which is fast to light and fulling.

Example 5

5 parts by weight of the dyestuff base obtained according to Example 4 are dissolved in 30 parts by weight of sulfuric acid monohydrate at a temperature below 20° C., cooled to 5° C. in an ice-bath, and 8 parts by weight of 27% oleum cautiously allowed to run in. After four hours' stirring, a test specimen poured into water dissolves with formation of a clear solution. The reaction mass is poured into ice and salt water, the dyestuff separated by suction-filtration and adjusted to neutrality by trituration with sodium carbonate. It dyes wool in red-brown shades which are fast to fulling and light.

Example 6

12.2 parts by weight of Bz-1-bromo-benzanthrone, 17 parts by weight of 1-amino-3-p-iso-octylphenoxyanthraquinone, 6 parts by weight of anhydrous potassium acetate and 0.5 part by weight of cuprous chloride are stirred with 100 parts by weight of nitrobenzene and heated for 6 hours at 200° C. Upon termination of the condensation, a test specimen poured into alcohol will be insoluble therein. The temperature is allowed to drop to 20° C., the precipitated dyestuff base is filtered off with suction and washed with chlorobenzene, then with alcohol and finally with water.

The obtained base is a red-brown crystalline powder which dissolves in concentrated sulfuric acid with a currant red coloration; upon addition of formaldehyde, this solution turns toward the violet-red. 5 parts by weight of the dyestuff base are dissolved, at a temperature below 5° C., in 40 parts by weight of oleum (9-10%) and stirred for several hours at 5° C., until a test specimen poured into water gives a clear solution. After being worked up in the manner described in the preceding examples, there is obtained a dyestuff which gives brownish orange dyeings; by using a weaker oleum (about 5 to 6%), a red-brown dyestuff is obtained. Both dyestuffs give, on wool, dyeings of very good fulling- and light-fastness.

Example 7

By replacing the 1-amino-3-p-tert.-amylphenoxyanthraquinone, in Example 4, by the same amount of 1-amino-4-p-tert.-amylphenoxyanthraquinone, a base is obtained which dissolves in sulfuric acid with black-blue coloration.

By sulfonation in the four-fold quantity of 5% oleum at a temperature below 20° C. until water-solubility is realized, there is obtained a brown dyestuff, dyeings of which on wool are fast to fulling and light.

Example 8

11.8 parts by weight of 1-amino-5-(4'-methyl)-phenoxyanthraquinone, 11.1 parts by weight of Bz-1-bromobenzanthrone or 10.1 parts by weight of Bz-1-chlorobenzanthrone, 4.5 parts by weight of anhydrous potassium acetate, 0.3 part by weight of cuprous chloride and 50 parts by weight of naphthalene are stirred together at 200° C.

until test specimens in alcohol no longer give a colored solution. With the bromo-benzanthrone, the condensation takes about 6 hours; with chloro-benzanthrone about 20 hours. The reaction mass is diluted with 100 parts by weight of chlorobenzene, suction-filtered, washed with chlorobenzene, alcohol and water, and dried. It is also possible to distil off the naphthalene in vacuo and then extract the residue with boiling water. A dyestuff base is obtained, which dissolves in sulfuric acid with olive-black coloration.

Sulfonation in 5% oleum at a temperature below 30° C. yields a dyestuff which dyes wool a light- and fulling-fast red-brown.

Similar brown shades are obtained by using the corresponding 2'-methyl- and 3'-methyl derivative of 1-amino-5-phenoxyanthraquinone, as well as from 1-amino-5-(2'.4'-dimethyl)-phenoxyanthraquinone and the isomers which contain the methyl group in the 2'.5'-, 2'.6'- and 3'.5'-positions.

*Example 9*

9.5 parts by weight of 1-amino-5-(2'.4'.6'-trimethyl)-phenoxyanthraquinone, 8.5 parts by weight of Bz-1-bromo-benzanthrone, 3 parts by weight of anhydrous potassium acetate and 0.3 part by weight of cuprous chloride are stirred for 6 hours in 50 parts by weight of naphthalene. Working up, as in the preceding examples, yields a dyestuff base which dissolves in sulfuric acid with an olive coloration.

5 parts by weight of this dyestuff base are dissolved in 20 parts by weight of sulfuric acid monohydrate, and the solution is cooled in an ice-bath. 7 parts by weight of oleum (27%) are allowed to run in at a temperature below 5° C. and the temperature is maintained for four more hours at below 5° C. Precipitation in ice and salt water gives a red-brown dyestuff.

By sulfonating with twice the quantity of oleum, a brown-orange dyestuff is obtained. Both dyestuffs are fast to fulling and to light.

*Example 10*

12.6 parts by weight of 1-amino-5-(p-tert.-amyl)-phenoxyanthraquinone, 10.1 parts by weight of Bz-1-bromobenzanthrone, 3.5 parts by weight of anhydrous potassium acetate, 0.3 part by weight of cuprous chloride, 0.1 part by weight of powdered copper and 100 parts by weight of anhydrous nitrobenzene are stirred together at 180° C. until test specimens in alcohol indicate the disappearance of the starting material. The condensation takes about 16 hours. The reaction mass is diluted with alcohol, suction-filtered, washed and dried. The obtained dyestuff base dissolves in sulfuric acid with a bluish gray coloration.

If the reaction temperature is raised to 200° C., the condensation is completed in 3 hours.

As diluent solvent, use may also be made of benzyl alcohol or methyl hexaline, whereupon a maximum temperature of 170° C. may not be exceeded.

The dyestuff base is dissolved in 6 parts by weight of oleum (5%) at a temperature below 5° C. and the solution stirred for 4 hours in an ice-bath. By precipitation in ice and salt water, a dyestuff of good solubility is obtained, which dyes wool, silk and nylon red-brown. The dyeings on wool are of excellent fulling- and light-fastness.

*Example 11*

By condensing 5 parts by weight of 1-amino-5-(2')-naphthoxyanthraquinone with 4.25 parts by weight of Bz-1-bromo-benzanthrone in the presence of 1.6 parts by weight of molten potassium acetate and 0.2 part by weight of cuprous chloride in 50 parts by weight of naphthalene for 6 hours at 200° C., a dyestuff base is obtained which dissolves in sulfuric acid with a greenish blue-black coloration.

Sulfonation with oleum (5%) at a temperature below 5° C. yields, after water-solubility has been reached, a dyestuff which dyes wool red-brown and which is of outstanding fulling- and light-fastness.

A similar dyestuff is obtained from 1-amino-5-(p-phenyl)-phenoxyanthraquinone and Bz-1-bromo-benzanthrone under the same conditions. The dyestuff base dissolves in sulfuric acid with olive-black coloration.

*Example 12*

By replacing the 1-amino-5-(p-tert.-amyl)-phenoxyanthraquinone in Example 10 by the same amount of 1-amino-6-(p-tert.-amyl)-phenoxy-anthraquinone and otherwise proceeding as set forth in Example 7, a dyestuff base is obtained which dissolves in sulfuric acid with an olive-orange coloration.

By sulfonating with oleum (10%) at a temperature below 5° C., an orange dyestuff is obtained; with 5% oleum a brown dyestuff is obtained. Both dyestuffs are fast to light and to fulling.

The dyestuff base obtained from Bz-1-bromobenzanthrone and 1-amino-7-(p-tert.-amyl)-phenoxyanthraquinone dissolves in sulfuric acid with a black-violet coloration and, upon sulfonation in the same manner as the 6-isomer, yields red-brown and orange dyestuffs.

*Example 13*

11.6 parts by weight of 1-amino-8-phenoxyanthraquinone, 11.4 parts by weight of Bz-1-bromo-benzanthrone, 3.9 parts by weight of anhydrous potassium acetate, 0.3 part by weight of cuprous chloride and 100 parts by weight of anhydrous nitrobenzene are stirred together for 5 hours at 200° C. The dyestuff base, isolated by precipitation with alcohol, dissolves in sulfuric acid with a black-blue coloration.

5 parts of the dyestuff base are introduced at a temperature below 5° C. into 50 parts by weight of 10% oleum and the mixture is stirred for 4 hours in an ice-bath. A test specimen in water will, at the end of this period, give a clear solution. The dyestuff is precipitated by pouring the reaction mass into ice and salt water, filtered off, and is adjusted to neutrality by trituration with solid sodium carbonate. The dyestuff dyes wool a powerful brown of good light-fastness.

A similar dyestuff is obtained from 1-amino-8-(3'-methyl)-phenoxyanthraquinone.

*Example 14*

The condensation of 11.8 parts by weight of 1-amino-8-(4'-methyl)-phenoxyanthraquinone with 11.1 parts by weight of Bz-1-bromo-benzanthrone in presence of 3.8 parts by weight of molten potassium acetate and 0.3 part by weight of cuprous chloride, using 50 parts by weight of naphthalene as solvent, is effected at about 200° C. for a period of about 8 hours, until test specimens in alcohol indicate the disappearance of the starting material. The product is a dyestuff base which dissolves in sulfuric acid with dark blue coloration.

The sulfonation of this base in 10% oleum at a temperature below 5° C. leads to a powerful brown dyestuff of excellent light- and fulling-fastness.

Example 15

11.3 parts by weight of 1-amino-8-(p-tert.-amyl)-phenoxyanthraquinone, 9.1 parts by weight of Bz-1-bromo-benzanthrone, 1.8 parts by weight of sodium carbonate, 0.3 part by weight of cuprous chloride and 50 parts by weight of nitrobenzene are heated to 180° C. and stirred at this temperature until test specimens in alcohol indicate the disappearance of the starting materials. If desired, the final heating may be up to 200° C. After dilution of the reaction mass, it is filtered, washed with alcohol and water, and dried. A dyestuff base is obtained, which dissolves in sulfuric acid with blue-black coloration.

5 parts by weight of the dyestuff base are introduced into 50 parts by weight of 10% oleum at a temperature below 5° C. and then stirred 4 hours in an ice-bath. A red-brown wool dyestuff is obtained, whose dyeings possess very good fastness to fulling and light. When use is made of 5% oleum, a somewhat more yellowish dyestuff is obtained.

The 1 - amino - 8 - (p - tert. - amyl) - phenoxyanthraquinone in this example may be replaced by 1 - amino - 8 - (p - tert. - butyl) - phenoxyanthraquinone.

Example 16

12.1 parts by weight of the condensation product from 1 - amino - 6.7 - dichloranthraquinone and phenol (1 - amino - 6 - chloro - 7 - phenoxyanthraquinone), 10.7 parts by weight of Bz-1-bromo-benzanthrone, 3.6 parts by weight of molten potassium acetate, 0.3 part by weight of cuprous chloride and 0.1 part by weight of copper powder are stirred with 50 parts by weight of anhydrous nitrobenzene at 200° C. until the starting materials have disappeared. The condensation takes about 5 hours. By diluting the reaction mass with alcohol and working up as previously described, a dyestuff base is obtained which dissolves in sulfuric acid with a dark-brown coloration.

Sulfonation of this base with 5% oleum at a temperature below 5° C. yields a brown dyestuff, while a brownish orange dyestuff is obtained with 10% oleum. Both dyestuffs are fast to light and fulling.

Example 17

8.9 parts by weight of the condensation product from 1 - amino - 6.7 - dichloranthraquinone and p-cresol are condensed with 7.8 parts by weight of Bz-1-bromo-benzanthrone, with addition of 2.8 parts by weight of molten potassium acetate and 0.2 part by weight of cuprous chloride, in 50 parts by weight of naphthalene by stirring for 6 hours at 200° C., and a dyestuff base is obtained which dissolves in sulfuric acid with dark brown-red coloration.

5 parts of the said base are introduced into 30 parts by weight of sulfuric acid monohydrate at a temperature below 20° C., the solution cooled in an ice-bath, and 9 parts by weight of 25% oleum added at a temperature below 5° C. After 4 hours' stirring, a test specimen has good solubility in cold water. The reaction mass is poured into ice and salt water and the filtered-off dyestuff is adjusted to neutrality by pasting with sodium carbonate. The dyestuff dyes wool a powerful brown. The dyeings are excellently light- and fulling-fast.

If use is made of a stronger oleum, a dyestuff of similar properties but of brown-orange shade is obtained.

Similar dyestuffs are obtained if, in this example, the condensation product from 1-amino-6.7-dichloranthraquinone and p-cresol is replaced by that from 1 - amino - 6.7 - dichloranthraquinone and p-ethylphenol or p-isopropylphenol.

Example 18

13.7 parts by weight of the condensation product from 1-amino-6.7-dichloranthraquinone and p - tert. - butylphenol (1 - amino - 6 - chloro - 7 - p-tert.-butylphenoxyanthraquinone), 9.75 parts by weight of Bz-1-bromo-benzanthrone, 3.3 parts by weight of anhydrous potassium acetate, 0.3 part by weight of cuprous chloride, 0.1 part by weight of copper powder and 50 parts by weight of anhydrous nitrobenzene are heated to 200° C. and this temperature is maintained while stirring for 5 hours. The formed base is worked up by expelling the nitrobenzene with steam or by diluting the reaction mass with alcohol, filtering and washing with alcohol and water. It dissolves in sulfuric acid with dark-brown coloration.

By sulfonation of the base, while cooling with ice, a powerful brown dye is obtained when using 5% oleum and a brown-orange dye when using 10% oleum.

Similar dyes are obtained by using p-tert.-amyl-phenol instead of p-tert.-butylphenol.

Example 19

14 parts by weight of 1-amino-5-(p-iso-octyl)-phenoxyanthraquinone are stirred with 9.4 parts by weight of Bz-1-bromo-benzanthrone, 3.3 parts by weight of anhydrous potassium acetate and 0.3 part by weight of cuprous chloride in 50 parts by weight of naphthalene for 6 hours at 200° C. The reaction mass is diluted with chlorobenzene or solvent naphtha, suction-filtered, and the base washed. It dissolves, after being dried, with olive coloration in sulfuric acid.

5 parts by weight of the base are dissolved in 30 parts by weight of sulfuric acid monohydrate, and 10 parts by weight of 25% oleum added to the solution. The mixture is stirred for several hours cold and is then heated slowly to 35° C. After a short time, a test specimen gives a clear solution in water. By pouring the reaction mass into ice and salt water and working up as in the preceding examples, there is obtained a red-brown dyestuff of good solubility which draws well onto wool from a neutral bath and yields dyeings which have good fastness to light and to fulling.

Having thus disclosed the invention what is claimed is:

1. An acid anthraquinone dyestuff, obtained by treating with a sulphonating agent a (Bz-1-benzanthronyl)-1-aminoanthraquinone which corresponds to the formula

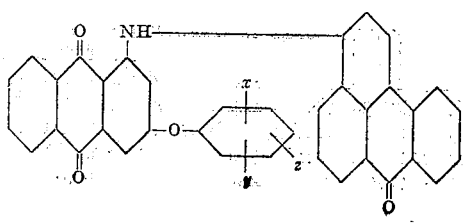

wherein each of $x$, $y$ and $z$ stands for a member selected from the group consisting of hydrogen and alkyl.

2. An acid anthraquinone dyestuff, obtained by treating with a sulphonating agent a (Bz-1-benzanthronyl)-1-aminoanthraquinone which corresponds to the formula

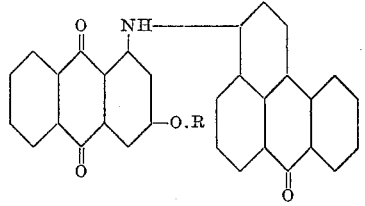

wherein R stands for a mononuclear aryl radical.

3. The acid anthraquinone dyestuff obtained by sulfonating with fuming sulfuric acid the (Bz-1-benzanthronyl)-1-aminoanthraquinone compound of the formula

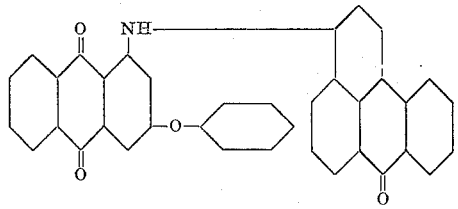

4. The acid anthraquinone dyestuff obtained by sulfonating with fuming sulfuric acid the (Bz-1-benzanthronyl)-1-aminoanthraquinone compound of the formula

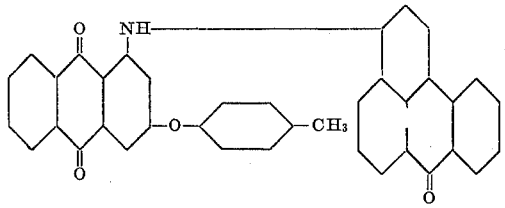

5. The acid anthraquinone dyestuff obtained by sulfonating with fuming sulfuric acid the (Bz-1-benzanthronyl)-1-aminoanthraquinone compound of the formula

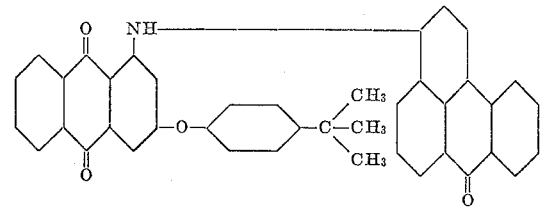

ALBIN PETER.
JACQUES GÜNTHART.

References Cited in the file of this patent

UNITED STATES PATENTS

| Number | Name | Date |
| --- | --- | --- |
| 1,711,710 | Wolff | May 7, 1929 |
| 1,896,435 | Wolff et al. | Feb. 7, 1933 |
| 2,227,543 | Gutzwiller | Jan. 7, 1941 |

FOREIGN PATENTS

| Number | Country | Date |
| --- | --- | --- |
| 535,789 | Great Britain | Apr. 22, 1941 |

OTHER REFERENCES

Beilstein, vol. 14, page 180.